United States Patent [19]

Yamamoto et al.

[11] Patent Number: 4,649,398

[45] Date of Patent: Mar. 10, 1987

[54] MOTOR DRIVEN EXTENSIBLE ROD ANTENNA FOR VEHICLES WITH POSITION CONTROL CIRCUIT

[75] Inventors: Akinori Yamamoto, Mie; Masaaki Kurii, Kariya, both of Japan

[73] Assignee: Nippondenso Co., Ltd., Kariya, Japan

[21] Appl. No.: 689,813

[22] Filed: Jan. 8, 1985

[30] Foreign Application Priority Data

Jan. 25, 1984 [JP] Japan .................................. 59-10242
Oct. 23, 1984 [JP] Japan .................................. 59-223483

[51] Int. Cl.[4] ......................... H01Q 1/10; G05B 19/29
[52] U.S. Cl. ...................................... 343/903; 318/603
[58] Field of Search ................ 343/903; 318/467, 603, 318/626

[56] References Cited

U.S. PATENT DOCUMENTS 4,542,383 9/1985 Cusey et al. ........................ 343/903

FOREIGN PATENT DOCUMENTS 2640995 3/1978 Fed. Rep. of Germany ...... 343/903
58-166106 11/1983 Japan .

*Primary Examiner*—E. Lieberman
*Attorney, Agent, or Firm*—Cushman, Darby & Cushman

[57] ABSTRACT

There is provided an electric antenna apparatus which is mounted on a vehicle such as an automobile, and in which the rotation of a DC motor drives and rotates a pinion through a reducing mechanism, and a cable coupled to the base end portion of an antenna rod is coupled to this pinion so as to come into engagement therewith. The cable is driven in its longitudinal direction due to the pinion, rotated in response to the rotation of the motor, and the antenna rod coupled to this cable is driven, thereby allowing the antenna rod to be extended or retracted. In this case, a magnetic disk, formed with a plurality of magnetic poles in its outer peripheral portion, is mounted to a worm wheel constituting the reducing mechanism so that the magnetic disk is rotated coaxially with the worm wheel. Also, a reed switch is attached to a circuit board set adjacent to the motor, thereby allowing a pulse-like signal from the reed switch to be detected in response to the rotation of the magnetic disk. A control circuit which constitutes a drive circuit to drive the motor and to which the pulse signal from the reed switch is supplied is installed in the circuit board. Due to this control circuit, the rotating state of the motor is controlled in response to an operation command, thereby allowing the antenna rod to be extended or retracted.

4 Claims, 11 Drawing Figures

MOTOR DRIVEN EXTENSIBLE ROD ANTENNA FOR VEHICLES WITH POSITION CONTROL CIRCUIT

BACKGROUND OF THE INVENTION

The present invention relates to an electric antenna apparatus mounted on a vehicle such as an automobile or the like and, more particularly, to an electric antenna apparatus which uses the rotation of a motor to control the raising and lowering of an antenna rod and which detects an amount of rotation of this motor, thereby making it possible to control, for example, an amount of projection of the antenna rod.

An antenna mounted on an automobile for the reception of radio waves is ordinarily constituted so as to protrude and be mounted on the outside of the vehicle body. The extension and retraction of this antenna rod are properly controlled by a motor.

Such extension and retraction control of the antenna rod is executed by switching on the rotation of the motor for driving the antenna rod by using a switch provided near the driver's seat. For example, when a switch for the radio is turned on, a switch signal is detected, and a command is generated to drive the antenna rod upward or downward. When using the control to raise or lower the antenna rod in this way, a cam mechanism, which is controlled in correspondence with the rotation of the motor for driving the antenna rod, and a limit switch mechanism and the like are combined and set in accordance with the whole raising position and storing position of the antenna rod, and the specified position of the antenna rod is detected, thereby executing the stop control of the motor and the like. On the other hand, where the rotation of the motor is restricted for some reason, a large current flowing through the motor in the restricted condition is detected by a bimetal or the like. When an excessive motor current is detected by this bimetal, the power supply circuit of this motor is disconnected, thereby protecting the motor from being burnt and damaged.

However, in an apparatus with such an arrangement, a plurality of limit switches have to be arranged around the cam mechanism to correspond with the stop position, so a large space is required. In addition, the operating durability deteriorates due to the wear and tear of the contact mechanism, abrasion of the cam mechanism, and the like.

As an improved apparatus in consideration of the foregoing points, an antenna apparatus such as disclosed in the Official Gazette of Japanese Utility Model Application Laid-open No. 58-166106 has been considered. The means adopted in this apparatus is such that a rotary shaft of the reduction gear, which is driven by the output shaft of the motor, is provided with the contact lever, which is rotated together with this rotary shaft. A plurality of fixed contacts are arranged on the circumference which is coaxial with the rotary shaft of the contact lever, thereby allowing the contact of the contact lever to come into contact with one of the plurality of fixed contacts in response to an amount of rotation of the rotary shaft. Namely, the contacts of the contact lever sequentially come into contact with the plurality of fixed contacts in correspondence to the rotation of the motor. A pulse-like signal is generated whenever the rotated contact comes into contact with one of the fixed contacts. Therefore, by counting such a generated pulse signal, the amount of rotation of the motor, namely, the position of the antenna rod, can be detected.

However, nothing is set forth in the above Laid-open Official Gazette with respect to a practical means for processing and controlling the pulse-like signal generated in response to the rotation of the motor as described above; the only information disclosed in this Gazette states that the control circuit, constituting this processing means, is mounted in the vehicle interior.

SUMMARY OF THE INVENTION

It is an object of the present invention to provide an electric antenna apparatus which is equipped for a vehicle in which the movement control state of the antenna rod can be observed, particularly in the non-contact state, and the antenna rod can be accurately controlled so as to be extended or retracted to a designated position.

Also, it is another object of the invention to provide an electric antenna apparatus in which, for example, even when the motor which drives the antenna rod is in the restricted condition, it is possible to effectively prevent this motor from such accidents that may cause it to be burnt and damaged due to a large current produced in this restricted condition.

Another object of the invention is to constitute the sensor mechanism for observing the moving state of the antenna rod so as to be sufficiently miniaturized and to sufficiently reduce the distance between the control means for controlling the rotating state of the motor for driving the antenna rod and the sensor mechanism, thereby allowing the stable control of the extension and retraction of the antenna to be certainly executed.

That is, an electric antenna apparatus for use in a vehicle according to the present invention is constituted in a manner such that, in the extending or retracting operation of the antenna rod driven by a motor, a pulse signal is generated under a non-contact condition in response to the motion of the rod, and the extending position of the antenna rod is detected by counting and storing this pulse signal. The count value is set to correspond with a command position which designates the extending position of the antenna rod, and the extending position of the antenna rod is observed due to this set count value information and the count value of the pulse signal, thereby controlling the operating state of the motor.

Therefore, according to the electric antenna apparatus with such an arrangement, the extending state of the antenna rod is observed due to the pulse-like signal generated under a non-contact condition with regard to the extending or retracting operation of the antenna rod, so that the operating durability is improved, and at the same time, the ascending position of the antenna rod can be arbitrarily designated and can be easily set and controlled. Consequently, this electric antenna apparatus can be effectively used as the antenna apparatus for a radio receiver installed in an automobile, and in particular, the heighth of antenna suited for the intensity of the electric field or the like of radio waves can be effectively set.

DETAILED DESCRIPTION OF THE PREFERRED EMBODIMENTS

Figure 1:
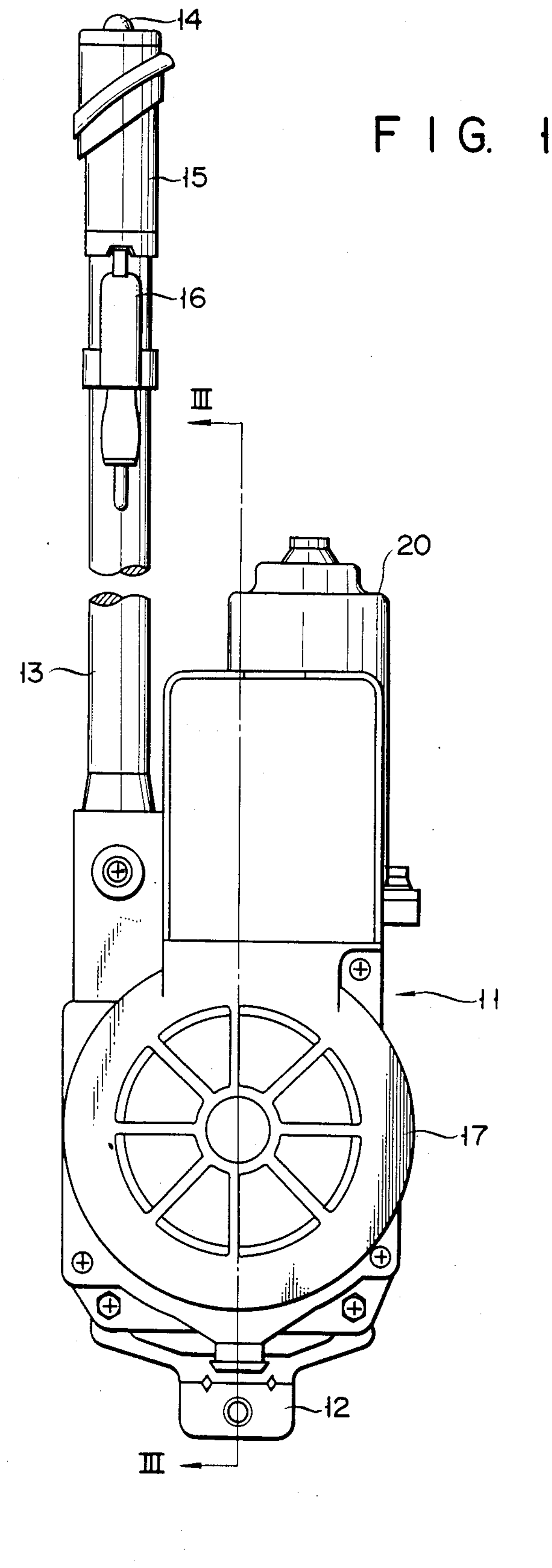
FIG. 1 is a front view showing the control mechanism section of an electric antenna apparatus for use in an automobile according to the first embodiment of the present invention.

FIG. 1 shows the outside appearance of an electric antenna apparatus designed for use in a vehicle, in which a main body housing 11 is fixed to a part of an automobile body, for example, to a reinforcing member or the like (not shown), by an attaching frame 12. An antenna holding pipe 13 is integrally attached to the housing 11. An antenna rod 14 is enclosed and set in the pipe 13 and can be extended through the opening portion at the top of the pipe 13 (this drawing shows the antenna rod 14 enclosed). In this case, an antenna fixing member 15 is attached to the top portion of the pipe 13. A portion of this member 15 protrudes outside the body through a hole pierced in automobile body, and the member 15 is fixed to the body by this portion. The antenna rod 14 is extended into the air from the top of the pipe 13, thereby setting the receiving condition of the broadcast radio waves. A terminal 16 is set placed on a portion of the pipe 13. This terminal is connected through, for example, an elastic member to the antenna rod 14 enclosed and set in the pipe. The terminal 16 is adapted to be connected to the radio receiver.

The housing 11 is made of, e.g., synthetic resin and is sealed by a cover 17.

Figure 2:
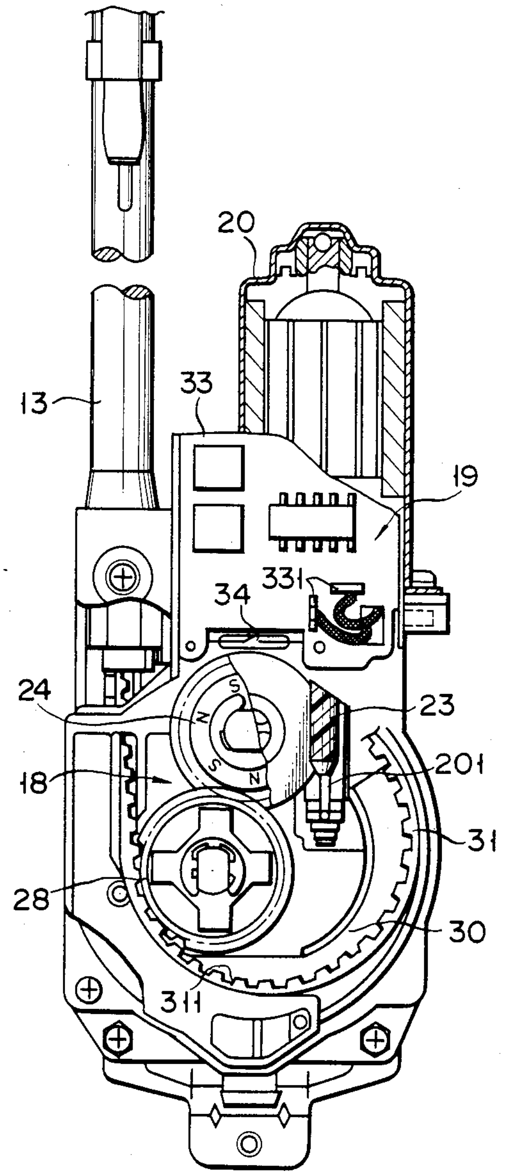
FIG. 2 is a front view showing the antenna apparatus shown in FIG. 1 with a part cut away.

FIG. 2 shows the cover 17 removed. A driving mechanism section 18 and a control circuit section 19 for the antenna rod 14 are set in the housing 11. A motor 20 for imparting the rotational power to the driving mechanism section 18 is also attached to the housing 11.

Figure 3:
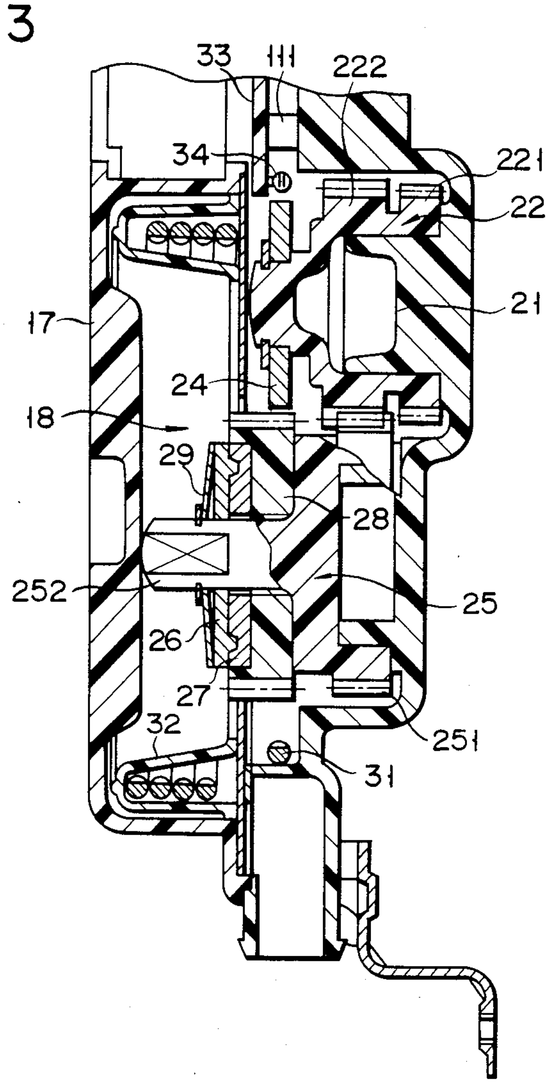
FIG. 3 is a cross sectional view of the portion taken along the line III—III of the antenna apparatus shown in FIG. 1.

As partially shown in FIG. 3, a boss 21 is formed in the driving mechanism section 18 of the housing 11 so as to be recessed protrude. A worm wheel 22 is rotatably supported by the boss 21. First and second gears 221 and 222 are coaxially provided for this worm wheel 22. The first gear 221 engages a worm 23, which is likewise set in the housing 11. The worm 23 is set to be coaxial to an output rotary shaft 201 of the motor 20, thereby allowing the rotation of the motor 20 to be transferred to the worm 23, so that the worm 23 is rotated. The worm 23 and first gear 221 constitute the reducing mechanism for reducing the rotation of the motor 20. A magnetic disk 24 is coaxially attached to the worm wheel 22, which is rotated by the motor 20 in this way. The disk 24 is magnetized so that a plurality of magnetic poles is formed in the circumferential portion and is constituted in a manner such that its rotating state is detected by the magnetic sensor mechanism.

The second gear 222 of the worm wheel 22 comes into engagement with a gear mechanism 251 formed on a clutch drum 25. The clutch drum 25 is rotatably mounted with respect to the bearing mechanism, which is set in the housing 11, and is rotated due to the rotation of the worm wheel 22. A clutch pressing plate 26 is attached to a central shaft 252 of the clutch drum 25 so as to be rotated integrally with the drum 25. The clutch pressing plate 26 is movable in the direction of an axial line of the shaft 252. A clutch plate 27 is coupled to the clutch pressing plate 26 through a plurality of projections formed on the surface portion of the plate 26. The plate 27 is set so as to be coaxially rotated around the shaft 252 and is coupled integrally with a pinion 28, which is rotatable and coaxially attached to the shaft 252. The pinion 28 is rotated with the clutch plate 27.

Namely, when the worm wheel 22 is rotated by the rotation of the motor 20, the clutch drum 25 and clutch pressing plate 26 are rotated, and the clutch plate 27 coupled to the pressing plate 26 through the plurality of projections formed thereon is rotated. In this case, the pressing force in the direction of the clutch plate 27 always acts on the clutch pressing plate 26 by means of a spring 29. The clutch pressing plate 26 is pressed to the clutch plate 27 by the spring 29. Therefore, when the force to obstruct the rotation acts on the clutch plate 27, the clutch pressing plate 26 is pushed against the spring 29 due to the projections of the clutch pressing plate 26, and the engagement with the projections is released, so only the clutch pressing plate 26 is slidably rotated.

A guide groove 30 is formed in the outer peripheral portion of the pinion 28, and this groove is continuous to the opening of the base end portion of the antenna holding pipe 13. A cable 31 is pulled out from the opening portion of the pipe 13 and is pressed into the groove 30. The cable 31 is coupled to the base end portion of the antenna rod 14 in the pipe 13. The extension and retraction of the antenna rod 14 is controlled by the movement of the cable 31 in the longitudinal direction. In this case, several teeth 311 are continuously formed in the surface of the cable 31, which faces the outer peripheral portion of the pinion 28. These teeth 311 come into engagement with the gear of the pinion 28, thereby allowing the extension and retraction of the antenna rod 14 to be controlled by the rotation of the pinion 28.

A cable enclosing drum 32 is formed at the position which is coaxial with the pinion 28. The cable 31 extruded from the guide groove 30 is wrapped and enclosed around the drum 32.

A circuit board 33 is further attached to the housing 11 so as to be close to the outer peripheral portion of the magnetic disk 24. A drive circuit of the antenna apparatus is built and set in the circuit board 33. A reed switch 34 is attached at a location close to the outer peripheral portion of the magnetic disk 24. That is, the reed switch 34 is turned on or off like a pulse in response to the rotation of the magnetic disk 24, so that a pulse-like rotation detection signal of the magnetic disk 24 is generated. This rotation detection signal is supplied to a control circuit section of the drive circuit built in the circuit board 33.

The circuit board 33 is mounted on a projected pedestal 111 formed in the housing 11 (FIG. 3) and is fixed by the cover 17. On one hand, terminals 331 to connect lead wires which are connected to a brush of the motor 20 are also formed in the board 33.

Figure 4:
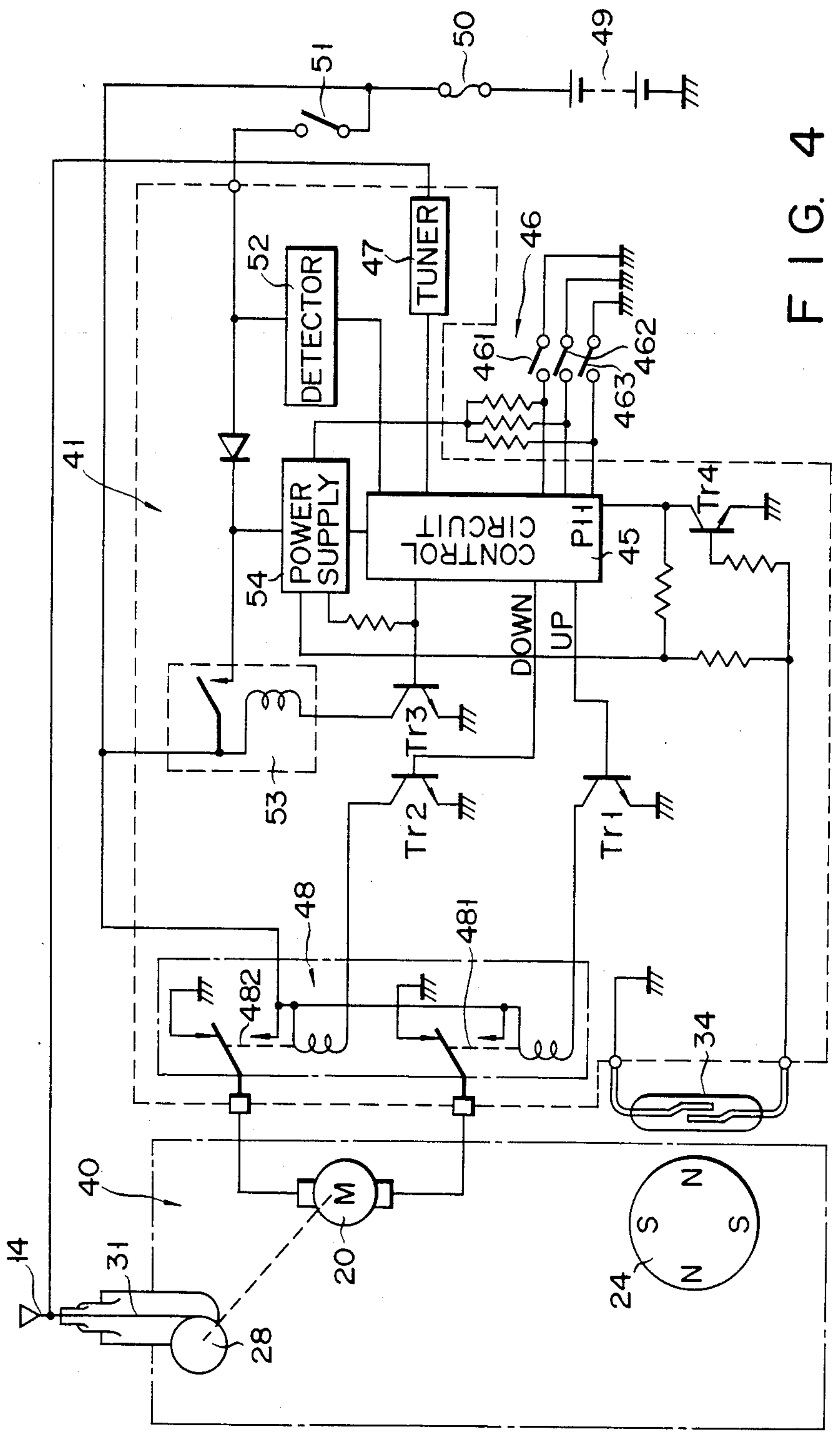
FIG. 4 is a circuit arrangement diagram for explaining a drive circuit of the antenna apparatus.

FIG. 4 shows an antenna driving mechanism section 40 of the antenna apparatus as described above and a section of a drive circuit 41 built and set in the circuit board 33. The drive circuit 41 is provided with a control circuit 45 constituted by a microcomputer. The control circuit 45 serves to execute predetermined operation processes in accordance with a predetermined control program and comprises an ROM for storing the control program, a CPU for executing the operation processes, an RAM serving as a storage device for temporarily storing the data relative to the operation processes, an input/output circuit for inputting and outputting various kinds of signals, etc.

Command signals from an operator command switching circuit 46 are supplied to the control circuit 45. The switching circuit 46 comprises an ascending switch 461, an intermediate position switch 462 and a descending switch 463. When one of these switches 461 to 463 is turned on, the other two switches are turned off. For example, the switching circuit 46 is constituted like the switches which select an arbitrary station on a car radio.

In the switching circuit 46, when the state is set in that an antenna extend command is given, the control circuit 45 detects this state, so that a receiving command is given to a tuner 47. A reception radio wave signal from the antenna rod 14 is connected to the tuner 47.

An extend or retract command signal is outputted from the control circuit 45 in accordance with the operating states of the respective switches 461 to 463 of the switching circuit 46. The extend command signal controls the conduction of a transistor Tr1, while the retract command signal controls the conduction of a transistor Tr2.

The transistors Tr1 and Tr2 serve to apply exciting currents to an ascending relay coil 481 and a descending relay coil 482 which respectively constitute a relay circuit 48 for driving the antenna. A power source is supplied to the relay circuit 48 from a battery 49 for the vehicle through a fuse 50. The power source from the battery 49 is further supplied to a power source detector 52 through an ignition switch 51. The turn-on of the ignition switch 51 is detected by this detector 52, thereby giving a command to the control circuit 45. That is, when this power detection signal is given to the control circuit 45, the control circuit 45 controls the conduction of a transistor Tr3 and drives a relay circuit 53, thereby making a regulating power circuit 54 operative to supply a power source to the control circuit 45.

The relay 481 or 482 of the relay circuit 48 serves to control the rotation of the motor 20. The pinion 28 is rotated due to the rotation of the motor 20, so that the cable 31 is driven and the antenna rod 14 is extended or retracted. On the other hand, the magnetic disk 24, which is set coaxially with the wheel 22, is rotated to correspond with the rotation of the motor 20, namely, in response to the movement of the cable 31. A pulse-like signal output from the reed switch 34 in correspondence with the rotation of the disk 24 serves to control a transistor Tr4. A pulse signal is generated from the transistor Tr4 to correspond to the amount of rotation of the disk 24, namely, in response to an amount of movement of the cable 31. This signal is supplied as a movement detection signal of the antenna rod 14 to the control circuit 45.

Figure 5A:
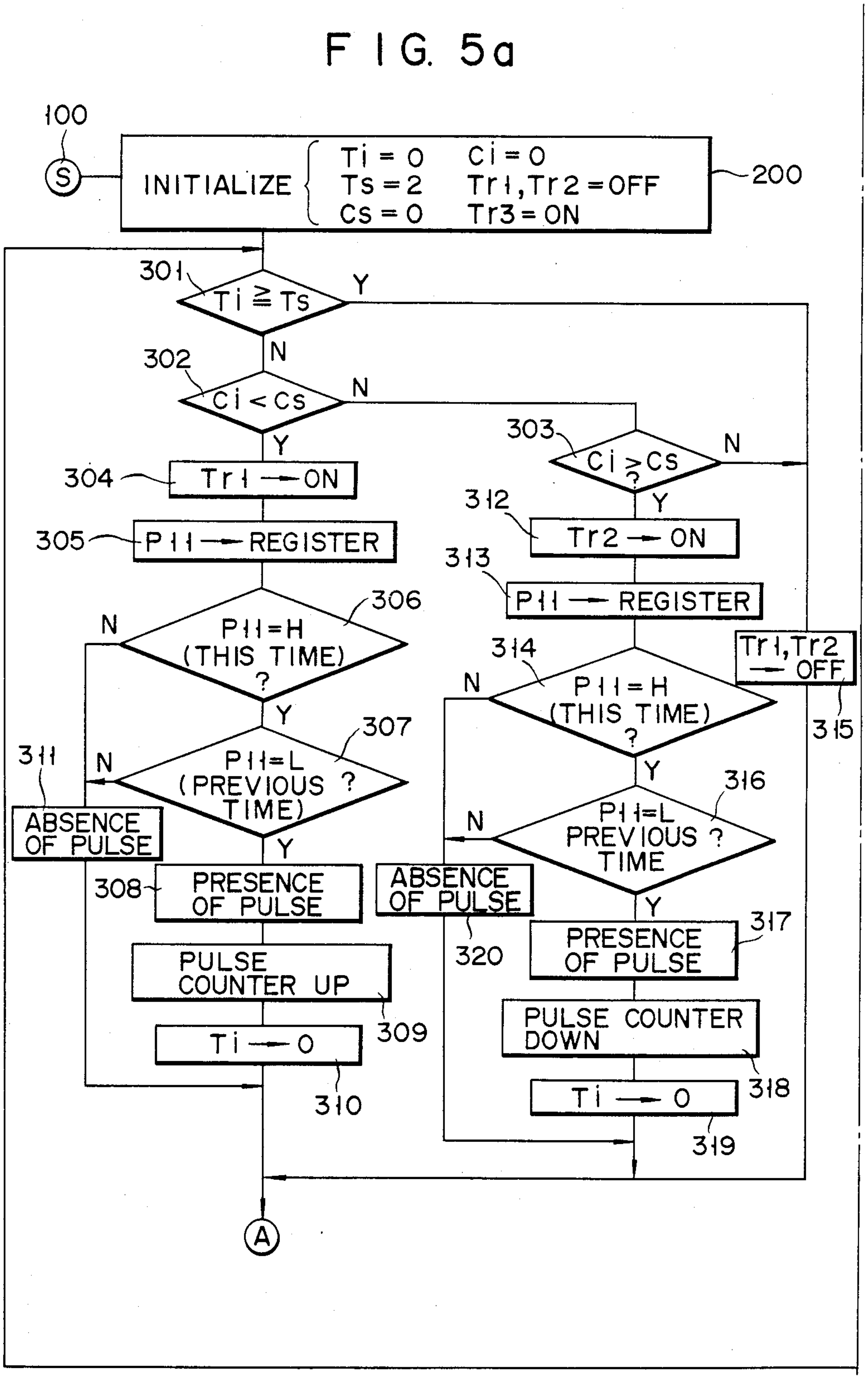
FIGS. 5*a* and 5*b* are flow charts for explaining the operating state of the control circuit section constituting the drive circuit shown in FIG. 4.
Figure 5B:
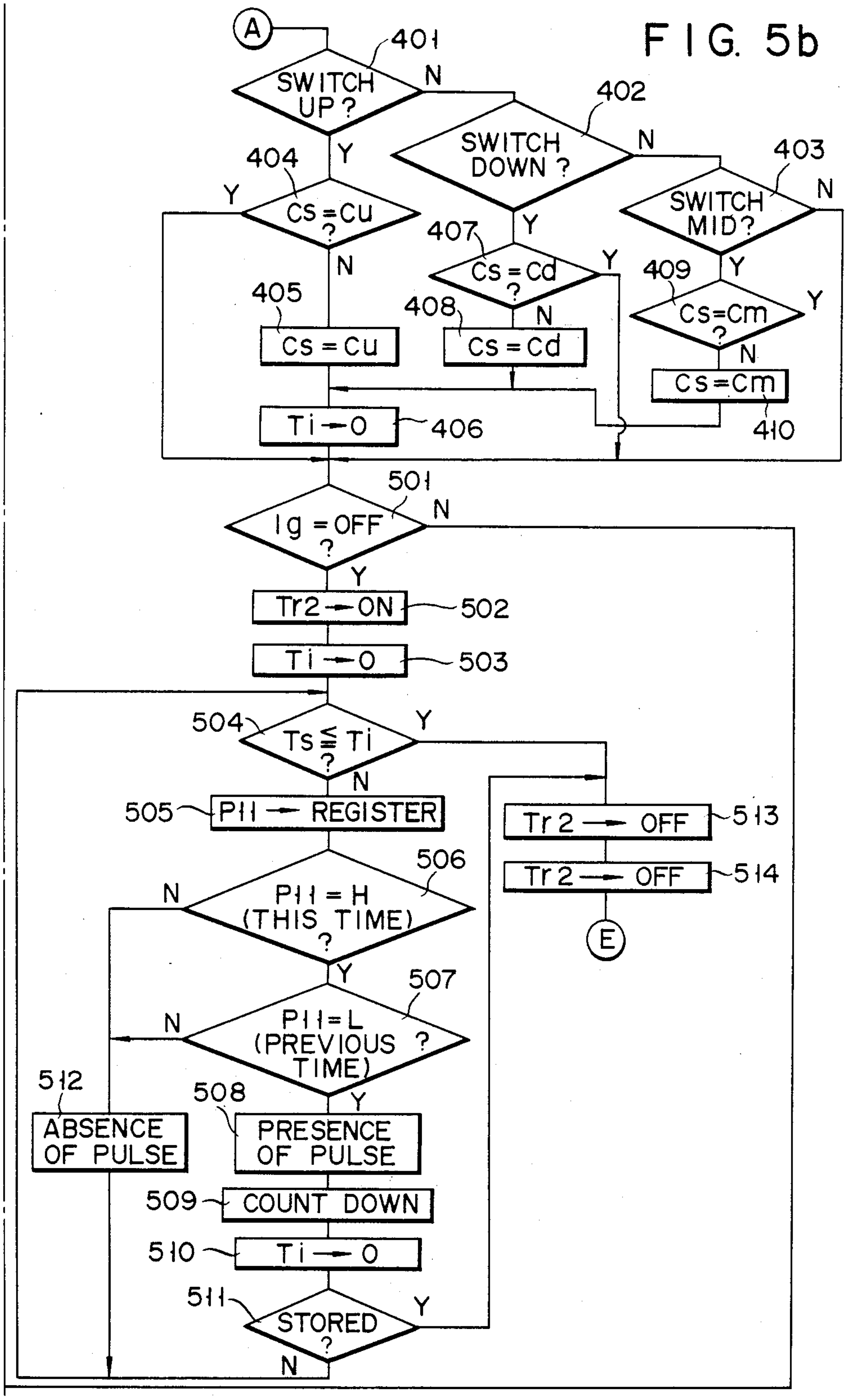

FIGS. 5*a* and 5*b* show flow charts for the control of the antenna apparatus as mentioned above. First, when the ignition switch 51 is turned on, the power circuit 54 is made operative, and the operating power source is supplied to the control circuit 45. The control circuit 45 then executes the operating processes in accordance with a control program at a cycle on, for example, the order of a few milliseconds.

That is, the operating processes are started in start step 100, the process routine first advances to routine step 200 for initialization, and the initialization is performed. Practically speaking, for instance, a timer data Ti is set to "Ti=0", a count data Ci obtained by counting the pulse signal generated in response to the moving operation of the antenna rod is set to "Ci=0", its count set value Cs is set to "Cs=0", a discrimination value of rotation restriction time Ts of the motor 20 is set to "Ts=2 seconds" (this restriction time set value is set by discriminating the heat resisting strength or the like of the motor 20), etc. Further, the transistors Tr1 and Tr2 for controlling the relay circuit 48 are turned off, and the transistor Tr3 is turned on. After executing the initialization in this way, various kinds of control operation routines are performed.

When it is assumed that the antenna rod 14 is completely enclosed under such initialization, the switch 461 for generating an extend command is operated to extend the antenna rod 14 enclosed in this state.

After completion of such initialization, step 301 first follows and a check is made to see whether or not the timer data Ti is the set time discrimination value Ts or more. When the elapsed time (i.e., the timer data Ti) is less than the Ts, step 302 follows. In step 302, the count data Ci is compared with the count set value Cs. In this case, since the apparatus is in the initialized state, "Ci=Cs=0", so that the process routine advances to step 303. In step 303, a check is made to see whether or not "Ci>Cs." In this case also, since the apparatus is in the initial state, step 315 follows. After confirming that both transistors Tr1 and Tr2 are in the OFF state, the process routine advances to step A to discriminate the signal of the operating switch. In the case where all of the switches 461 to 463 are not turned on, it is determined that no signal is generated in each of steps 401 to 403 to discriminate the respective switch signals indicative of the extend (UP), retract (DOWN) and intermediate (MID) positions, so that the process routine advances to step 501 to check an ignition switch Ig.

In this case, since the ignition switch 51 has been turned on, the process routine is returned to the foregoing step 301, and the elapsed time discriminating step is executed. In this way, one process of the control operation routine is finished.

In the state where such routine processes are being performed, if the time Ti equals or exceeds the set time Ts in this elapsed time discriminating step 301, step 315 will follow directly and the foregoing routine will be repeated.

In such an operating process routine, if the switch 461 to generate the extend command of the antenna rod is operated, the process routine advances from checking step 401 to step 404. In this step 404, a check is made to see whether or not the set value Cs is set to an up count value Cu. In this case, since the apparatus is still in the initial state, the count set value Cs is 0, so that step 405 follows to signal the setting of the count value. In this step 405, the value Cu (e.g., 100) is set to correspond to the number Np of pulses generated from the reed switch 34 in association with the rotation of the magnetic disk 24 during the time interval from the command to the full extension of the enclosed antenna rod 14, then step 406 follows. In this step 406, the timer data Ti is reset to 0. After the timer was reset, step 501 follows, and the process routine is returned to step 301 from step 501.

In this case, since the timer data Ti is set to 0, step 302 follows after step 301. However, since the set value Cs is set to Cu, the process routine advances to step 304 from step 302, thereby controlling the transistor Tr1 for signalling that the extension be set to the ON state. Namely, the relay 481 is excited, thereby supplying the driving current to rotate the motor 20 in the direction for extending the antenna rod 14. Thus, the antenna rod 14 is moved upward.

When the extending operation of the antenna rod 14 is executed in this way, the magnetic disk 24 is rotated in correspondence to this extend operation. This rotation is detected by the reed switch 34, and the detection pulse signal is supplied to the control circuit 45.

When the antenna rod 14 is extended in this way, step 305 follows, so that the pulse signal responsive to the detection signal from the reed switch 34 is supplied to a register (hereinbelow this register is referred to as P11 for convenience) set in the control circuit 45, and the process routine advances to the next step 306. In step 306, a check is made to see whether or not the signal from the reed switch 34, supplied to the register P11, is at a high level H. When it is determined to be at a high level, step 307 follows. In step 307, a check is likewise made to see whether or not it is at a low level L. Where it is determined to be at a low level in step 307, it is detected that the input level of the register P11 changes from the low to high level. Thus, the presence of the pulse signal is confirmed next in step 308. A count-up command is generated to the pulse counter set in the control circuit 45 next in step 309. Thereafter, the timer data Ti is set to 0 in step 310, and the process routine advances to step 401 to check the switch 461 for signalling the extension. Since the switch 401 has been turned on, step 404 is then executed. However, in this state, the set value Cs has been set to the count value Cu necessary for allowing the antenna rod 14 to be fully extended; therefore, the process routine advances to step 501 and returns to step 301. Such a control routine is repeatedly executed until "Ci=Cu".

Where the detection signal from the reed switch 34 is at a low level or is not changed, the process routine advances from step 306 or 307 to step 311 to check the absence of the pulse, and step 401 is then executed. However, in this state, the count value Ci does not reach the count value Cu yet, so that step 501 follows after step 404 and the extend operation of the antenna rod is continued. The routine which passes through step 311 is executed since the period of the pulse signal generated from the reed switch 34 is longer than the period of the above process routine. In the case where the extend operation of the antenna rod 14 is normally executed, the pulse-like detection signal is detected from the reed switch 34, and the count value Ci is counted up whenever this pulse signal is detected.

When the extend operation of the antenna rod is continued in this way and the antenna rod is completely extended, the count data Ci coincides with the set value Cu. Namely, "Ci=Cu=Cs," and the process routine advances to step 303 as the result of discrimination in step 302. Further, step 315 follows, and the transistors Tr1 and Tr2 are turned off. Namely, the extend operation of the antenna rod 14 is stopped and finished.

Next, to enclose the rod 14 in the state where the antenna rod 14 has been extended as described above, the switch 463 to instruct the retraction is operated. When the switch 463 is turned on, the process routine advances from step 402 to step 407 in the foregoing operating process routine. Since the Cs has been set to Cu in the above process routine for the extend operation, step 408 follows after step 407. In step 408, the set value Cs is set to a down count value Cd. This count value Cd is set to a value, e.g., 0, corresponding to the count value when the antenna rod 14 is enclosed. Thereafter, the processes similar to those in the case of the foregoing extend operation processes are executed. However, since "Ci>Cs" in step 302, step 303 follows. After step 303, step 312 follows, and the transistor Tr2 is turned on, thereby supplying the driving current to the motor 20. Thus, the motor 20 is rotated to retract the antenna rod 14. Namely, the antenna rod 14 is moved downward.

In such a retracting operation state, the processes similar to those in steps 306, 307, 308, and 311 are executed in steps 314, 316, 317, and 320, then the count value of the pulse counter is counted down in step 318.

The retract operation of the antenna rod 14 is continued in this way. When the count value Ci becomes Cs (=Cd) in this step of the retract operation and the enclosing state is confirmed, the process routine advances from step 303 to step 315. The transistors Tr1 and Tr2 are turned off, and thereafter, the retract operation of the antenna rod is finished.

In the case of setting the antenna rod 14 to an intermediate position, the switch 462 is operated. When the switch 462 is turned on, the process routine advances to step 409 through step 403. In this state, the set value Cs is set to the count value corresponding to the fully extended state or enclosed state, so that step 410 follows after step 409.

In step 410, the set value Cs is set to a count value Cm corresponding to the middle position. This count value Cm is set to the numeric value, for instance, "50," corresponding to the pulse count value when the antenna rod 14 is at the middle position. After the set value Cs was set in this way, the timer is reset in step 406, and the process routine returns to step 301.

Since the timer is reset and "Ti=0" in this step 301, step 302 follows next. However, the count value Ci is set to the numeric value responsive to either the fully extended state or enclosed state depending on the state of the antenna rod 14 at this time. Therefore, when the rod 14 has been fully extended, "Ci>Cs" and step 303 follows. On the contrary, when the rod is enclosed, step 304 follows. Thus, the antenna rod 14 is driven and controlled in a similar manner as in the foregoing extending or retracting operation. When "Ci=Cm", that is, when the antenna rod 14 is set at the middle position, the transistors Tr1 and Tr2 are turned off. The setting operation of the antenna at the middle position is finished.

In such an extending or retracting operation process of the antenna rod, if the rotation of the motor 20 is restricted for some reasons, the discrimination state wherein no pulse is generated in step 311 or 320 is continued. In this continuous discrimination state, the operation of the timer reset in step 310 or 319 is not executed, but the data Ti increases with the elapse of time and this value will exceed Ts. Consequently, this state is detected in step 301, and the transistors Tr1 and Tr2 are turned off in step 315, thereby causing the operation for controlling the antenna to be stopped.

Figure 6:
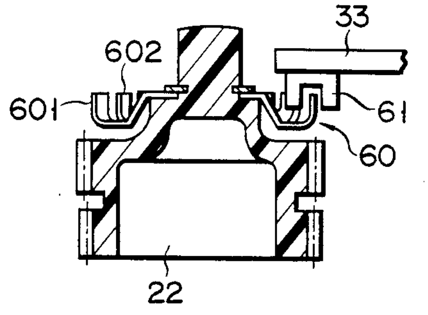
FIG. 6 is a diagram showing the rotation detecting section constituting an electric antenna apparatus according to the second embodiment of the present invention.

In the foregoing embodiment, the moving operation state of the antenna rod 14 is detected by the magnetic disk and reed switch under the non-contact condition. Various means for detecting the rotating state of the wheel 22 to drive the antenna rod 14 in such a non-contact state can be considered. For instance, as shown in FIG. 6, a shield plate 60 is disposed coaxially with the wheel 22 so as to be rotated integrally with the wheel 22. The shield plate 60 has a plurality of projections 601, 602, . . . so as to protrude in the outer peripheral portion. A photo detecting device 61 consisting of infrared emitting diodes and a photo transistor is set so as to sandwich this projecting portion. This detecting device 61 is attached to the circuit board 33 in a manner similar to the reed switch 34.

Namely, a pulse-like signal is detected by the photo detecting device 61 in response to the rotation of the shield plate 60, which is rotated simultaneously with the wheel 22. This pulse detection signal is handled in a manner similar to the output signal from the reed switch 34.

Figure 7:
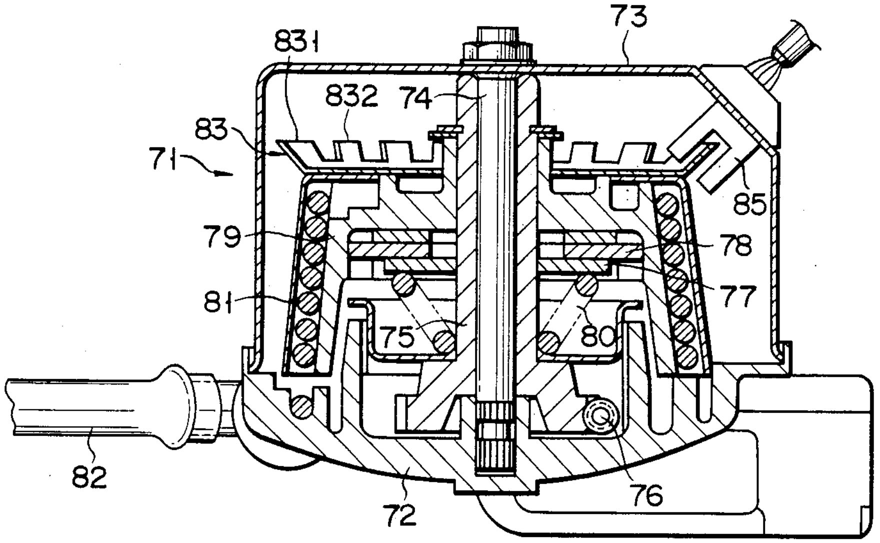
FIG. 7 is a cross sectional view of the antenna driving mechanism section for explaining the third embodiment of the invention.

FIG. 7 shows the third embodiment of the invention, in which a main body section 71 of the electric antenna apparatus is provided with a base 72 for attaching the main body 71 to an automobile body and a shaft 74 supported by a housing 73. A wheel 75 is rotatably mounted around the shaft 74. A worm 76 engages the gear portion formed on the wheel 75. Although not shown in particular in this diagram, a DC motor for driving the antenna is coupled with the worm 76, thereby rotating the wheel 75 in association with the rotation of this DC motor. A clutch pressing plate 77 is integrally coupled with the wheel 75. A plate 78 is disposed so as to surround the outer periphery of the wheel 75 in a manner such that the plate 78 faces the pressing plate 77. This clutch plate 78 is rotated integrally with a drum 79.

The force of a spring 80 always acts on the clutch pressing plate 77. The contact relation is maintained between the pressing plate 77 and clutch plate 78. Namely, the rotation of the worm 76 is transferred to the drum 79.

A cable 81 is wrapped around the drum 79, and one end portion of the cable 81 is coupled to an antenna rod 82, thereby allowing the cable 81 to be taken up or rewound and pulled out in correspondence to the rotation of the drum 79. Thus, the extending or retracting operation of the antenna rod 82 is executed.

Figure 8:
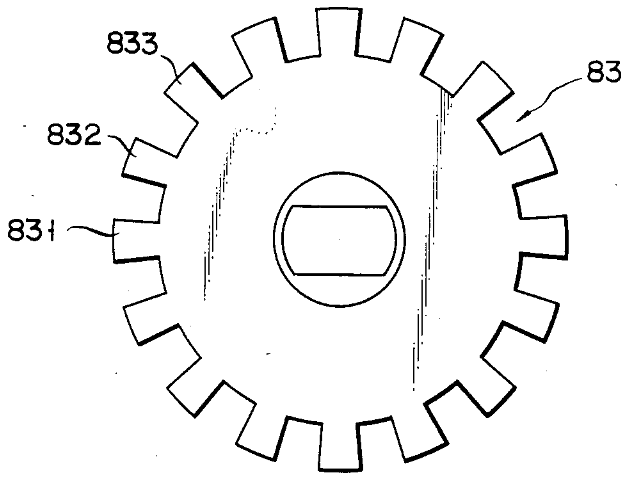
FIG. 8 is a diagram showing a shield plate used in the embodiment shown in FIG. 7.

A shield plate 83 is coaxially coupled to the drum 79. As partially shown in FIG. 8, a number of projections 831, 832, . . . which are used to generate a signal are formed in the outer peripheral portion of the shield plate 83 due to a punching method or the like. The shield plate 83 is formed like a circular disk by material so as to shield the light. A photo detecting device 85 is disposed in the portion where the projections 831, 832, . . . of the shield plate 83 pass, thereby generating a pulse-like signal in response to the rotation of the shield plate 83, i.e., the drum 79.

Figure 9:
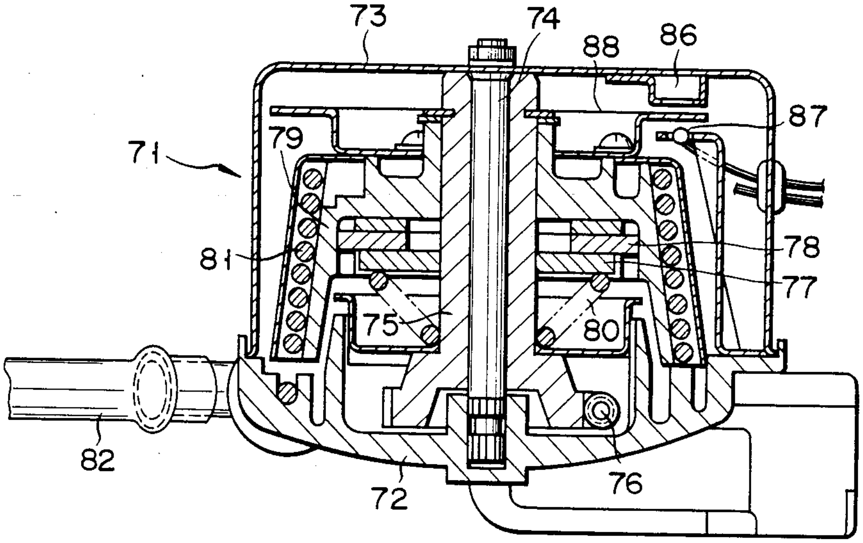
FIGS. 9 and 10 are cross sectional views of the antenna driving mechanism sections for explaining the fourth and fifth embodiments of the invention, respectively.

In the embodiment shown in FIG. 9, in the electric antenna apparatus constituted similarly to that shown in FIG. 7, a pulse-like signal is generated due to a permanent magnet 86 and a reed switch 87. That is, a shield plate 88 rotatable with the wheel 75 is disposed. The magnetic circuit between the magnet 86 and the reed switch 87 is intermittently shut out by the shield plate 88, so that a pulse-like signal is generated.

In the embodiments shown in FIGS. 7 and 9, the state where the shield plate 83 or 88 is attached to the drum 79 has been shown. However, as shown in FIG. 10, the shield plate 83 may be directly attached to the wheel 75.

Figure 10:
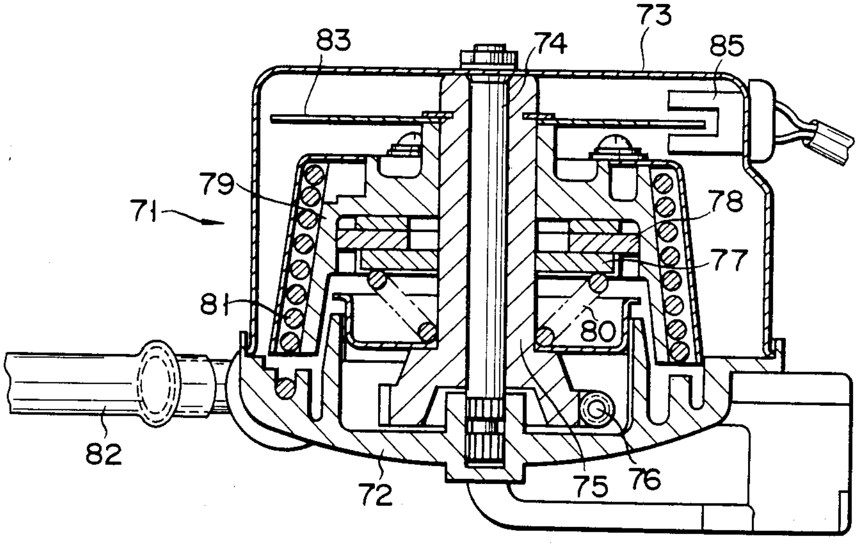

In FIGS. 9 and 10, the same parts and components as those shown in FIG. 7 are designated by the same reference numerals and their detailed descriptions are omitted.

What is claimed is:

1. An electric antenna apparatus for vehicles, comprising:

an antenna rod;

a rotary member for driving a cable coupled to said antenna rod, in the longitudinal direction of the antenna rod, and extending and retracting said antenna rod;

a motor, provided with an output shaft coupled thereto by a reducing mechanism constituted by a worm wheel, for rotating said rotary member;

pulse signal generating means placed in a non-contact state with said rotary member and including a rotation detecting plate rotatable coaxially with the worm wheel, said pulse signal generating means generating a pulse signal in response to the rotation of the rotation detecting plate, which takes place when said rotary member rotates in response to the extending or retracting of said antenna rod;

drive means provided with a control circuit to which the pulse signal generated by said pulse generating means is supplied and which drives and controls said motor so as to extend or retract said antenna rod;

antenna rod position signal setting means which is provided within the control circuit of said drive means and which counts the pulse signal generated from said pulse signal generating means and stores the count value corresponding to the position of said antenna rod;

stop position set instructing means for setting each stop position such as the fully-extending position, enclosed position, and middle position, etc., of said antenna rod;

pulse count value setting means for setting a pulse count value corresponding to each of said stop positions in response to a command from said stop position set instructing means;

operation command generating means which compares the pulse count value set in response to the command from said stop position set instructing means with the count value stored by said antenna rod position signal setting means, thereby generating an operation command for extending or retracting said antenna rod to said motor;

stop control means for generating a stop command to said motor when the pulse count value corresponding to said stop position coincides with said count value stored in said antenna rod position signal setting means; and a circuit board into which the control circuit of said drive means is installed and which is located adjacent to said motor, said circuit board being provided with signal detecting means which constitutes said pulse signal generating means.

2. An apparatus according to claim 1, wherein said pulse signal generating means is constituted by a magnetic mechanism rotated together with a worm wheel constituting the reducing mechanism to which the rotation of said motor is transferred, and magnetism detecting means set in said circuit board and which detects the close passing of the magnetic pole portion of said magnetic mechanism and generates a pulse-like detection signal.

3. An apparatus according to claim 1, wherein said magnetism detecting means consists of a reed switch.

4. An apparatus according to claim 1, wherein said pulse signal generating means is constituted by a photo detecting device which is attached to said circuit board and a light shield plate which is rotated together with a worm wheel constituting the reducing mechanism to which the rotation of said motor is transferred, said light shield plate is constituted so as to intermittently control the light which is detected by said photo detecting device due to its rotation, and a pulse-like signal in response to the intermittence of said light is detected from said photo detecting device.

* * * * *